United States Patent [19]

Slusher et al.

[11] Patent Number: 4,984,298

[45] Date of Patent: Jan. 8, 1991

[54] WIDEBAND LOW NOISE DETECTOR

[75] Inventors: Richart E. Slusher, Lebanon; Bernard Yurke, Plainfield, both of N.J.

[73] Assignee: AT&T Bell Laboratories, Murray Hill, N.J.

[21] Appl. No.: 120,734

[22] Filed: Nov. 10, 1987

Related U.S. Application Data

[63] Continuation of Ser. No. 880,796, Jul. 1, 1986, abandoned.

[51] Int. Cl.$^5$ ............................................. H04B 10/06
[52] U.S. Cl. ..................................... 455/619; 330/4.5; 356/354
[58] Field of Search ............... 455/619, 600, 612, 617; 330/4.5; 356/354; 370/1

[56] References Cited

PUBLICATIONS

Yuen et al. –"Generation and Detection"–Optics Letters–vol. 4, No. 10–1979, pp. 334–336.
Yurke–"Use of Cavities in Squeezed State Generation'-'–Physical Review A–vol 29, No. 1–1984, pp. 408–410.
Davis et al.–"Closed Loop, Low Noise Fiber Optic Rotation Sensor", Optics Letters–vol. 6, No. 10–1981–pp. 505–507.
Yurke–"Squeezed–Coherent–State"–Physical Review A, vol. 32, No. 1, Jul. 1985, pp. 300–310.
Yurke–"Wideband Photon Counting and Homodyne Detection"–Physical Review A–vol. 32, No. 1, Jul. 1985, pp. 311–323.
Slusher et al.–Observation of Squeezed States–Physical Review Letters–vol. 55, #22, Nov. 25, 1985, pp. 2409–2412.
"Squeezed States of Light", Nature, 1983, pp. 141–146, by D. F. Walls.
"Quantum-mechanical Noise in Interferometer", Physical Review D, vol. 23, 1981, pp. 1693–1708, by C. M. Caves.
"Squeezed States in Phase-sensing Interferometers", Physical Review D, vol. 30, 1984, pp. 2548–2556, by R. S. Bondurant and J. H. Shapiro.

Primary Examiner—Joseph A. Orsino
Assistant Examiner—Joseph A. Van Beek
Attorney, Agent, or Firm—Eugen E. Pacher

[57] ABSTRACT

Low noise devices such as e.g., detectors of electromagnetic signals utilize parametric amplifiers to produce squeezed noise states at pairs of frequencies symmetrically located about a common, carrier frequency. Devices of the invention can be included, e.g., in interferometers, ring gyroscopes, and coherent communications systems.

9 Claims, 3 Drawing Sheets

WIDEBAND LOW NOISE DETECTOR

This application is a continuation of application Ser. No. 880,796, filed July 1, 1986 now abandoned.

TECHNICAL FIELD

This invention relates generally to devices which measure the phase of an electromagnetic signal, or compare the measured phases of two such signals.

BACKGROUND OF THE INVENTION

Many instruments and systems are limited in sensitivity or bandwidth by noise in the electromagnetic field measured by such instruments or utilized in such systems. For example, coherent communications systems typically distinguish signals which are 180° apart in phase, and instruments such as interferometers and ring gyroscopes rely on the comparison of small phase differences between electromagnetic signals which correspond to the physical quantities they measure. Uncertainties in phase due to noise in such devices limit their accuracy and utility. Although many sources of noise may be eliminated by proper design, a fundamental limit is imposed by the requirements of quantum mechanics, in that zero point fluctuations of the electromagnetic field (present even at zero temperature) cannot be eliminated. Thus, the electric field of a single electromagnetic mode of angular frequency $\omega$ can be written as $$E = E_o(X_1 \cos \omega t + X_2 \sin \omega t),$$

where $E_o$ is a constant containing the amplitude of the field, and $X_1$ and $X_2$ are real-valued quantities known as field quadrature operators. The Heisenberg uncertainty principle requires that the variances, $\Delta X_1$ and $\Delta X_2$, of such operators are related by the uncertainty relation $$\Delta X_1 \Delta X_2 \geq \tfrac{1}{4}.$$

Although $\Delta X_1$ and $\Delta X_2$ may be unequal in principle, for devices known to the present art (such as single mode lasers), these variances are typically equal and hence take the minimum values $\Delta X_1 = \tfrac{1}{2}$, $\Delta X_2 = \tfrac{1}{2}$. This minimum uncertainty in the quadrature operators is in turn reflected in minimum uncertainties in measurements of the electric field, E. For example, if E were to be measured at periodic intervals corresponding to $\omega t = N\pi$, where N is an integer, only the first quadrature term would contribute, and such measurements would therefore be subject to the variance of $X_1$. Conversely, if measurements were made at times such that $\omega t = (N+\tfrac{1}{2})\pi$, where N is an integer, only the second term would contribute and such measurements would be subject to the variance of $X_2$. So long as the variances are equal, no advantage in the accuracy of such measurements is possible by selecting either $X_1$ or $X_2$.

In principle, however, it is possible to construct fields E such that the variances of $X_1$ and $X_2$ are unequal, e.g., that $\Delta X_1 < \tfrac{1}{2}$ and $\Delta X_2 > \tfrac{1}{2}$ while preserving the product rule $\Delta X_1 \Delta X_2 \geq \tfrac{1}{4}$. It has been recognized for some time that such states of the electromagnetic field, called "squeezed states", are permitted by theory. See, for example, the review by D. F. Walls in *Nature*, Vol. 306, pp. 141–146 (1983). Providing that such squeezed states can be realized in a working device, the possibility of improving accuracy in devices such as interferometers has been noted by a number of authors; e.g., C. M. Caves, in *Physical Review*, Vol. D23, pp. 1693–1708 (1981), and R. S. Bondurant and J. H. Shapiro, in *Physical Review*, Vol. D30, pp. 2548–2556 (1984).

Many phase-dependent nonlinear phenomena have been suggested for squeezed state generation, as described by Walls in the above-cited review article. In particular, H. P. Yuen and J. H. Shapiro, in *Optics Letters*, Vol. 4, pp. 334–336 (1979), suggested the interaction of four electromagnetic waves ("four-wave mixing") as a generation mechanism. Four-wave mixing has typically been described in connection with so-called "degenerate" mixing, in which all four waves have a common (angular) frequency $\omega_p$, the frequency of the "pump" used to provide the coherent input waves (typically a laser source). The use of an optical cavity to enhance the generation process has been suggested by B. Yurke, in *Physical Review*, Vol. A29, pp. 408–410 (1984). However, it has proven difficult in practice to achieve the conditions necessary to produce and measure squeezed states. In particular, a problem with the approach based on degenerate four-wave mixing has been extraneous noise generated, for example, by spontaneous emission or scattering from the (pumped) mixing medium at frequencies equal to or nearly equal to the pump frequency. Such extraneous noise adds to the quantum noise which must be squeezed to reach the quantum limit.

SUMMARY OF THE INVENTION

Devices comprising parametric amplifiers are described which produce squeezed states of an electromagnetic field at selected frequencies essentially symmetrically spaced about a common, carrier frequency, deviation from symmetry preferably being limited to less than 10% of frequency separation. Related devices comprising low noise detectors are also described which, periodically during each cycle of an electromagnetic field, reduce the noise associated with such field at such frequencies below the minimum level achieved in corresponding devices in which the noise is uniform throughout each cycle. Noise is preferably reduced to less than 90% of its minimum uniform level. In particular, if such noise is due to vacuum fluctuations of the electromagnetic field, it will be reduced below the minimum uniform level required by quantum mechanics. Embodiments of this invention are described which permit measurement of the phase of an electromagnetic wave to an accuracy hitherto unachievable, and include precision interferometers, ring gyroscopes and phase-keyed coherent communications systems.

BRIEF DESCRIPTION OF THE DRAWINGS

A more complete understanding of the invention may be obtained by reading the following description in conjunction with the appended drawings, in which.

DETAILED DESCRIPTION

In a preferred embodiment, this invention utilizes the interaction of photon beams in a nonlinear medium (a "parametric amplifier") to generate squeezed states of the electromagnetic field; i.e., states in which, in the notation introduced above, $\Delta X_1 \neq \Delta X_2$. Such nonlinear medium is placed in an optical cavity which is pumped with an input beam (e.g., light from a laser source) in such a way that its susceptibility has a component oscillating at (angular) frequency $2\omega_o$. The medium then produces pairs of photons in which one photon has a frequency $\omega_1 = \omega_o - \Delta$, while the other has a frequency $\omega_2 = \omega_o + \Delta$, where $\Delta$ is such that $\omega_1$ and $\omega_2$ are modes of the electromagnetic field in the cavity. As shown by B. Yurke, in *Physical Review*, Vol. 32, No. 1, pp. 300–310 (1985), and in *Physical Review*, Vol. 32, No. 1, pp. 311–323 (1985) (both of which are included herein by reference), such parametric amplifiers result in squeezed states with frequency components at the sideband frequencies $\omega_1$ and $\omega_2$, away from extraneous noise generated at or near the frequency $\omega_o$. In one embodiment of a parametric amplifier according to this invention, the nonlinear medium is pumped with a photon beam at frequency $2\omega_o$; in another (four-wave mixing), the medium is pumped at frequency $\omega_o$.

Figure 1:
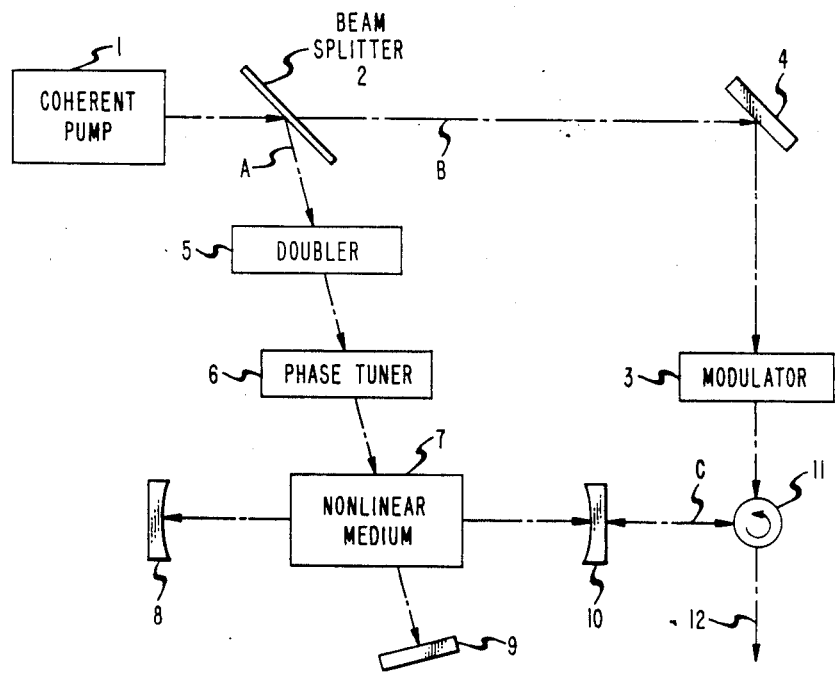
FIG. 1 is a top view of a noise reducing device constructed in accordance with the principles of this invention.

FIG. 1 shows a noise-reducing device according to the present invention, comprising a coherent pump 1 (e.g., a laser or microwave source) producing a pump beam of angular frequency $\omega_p = \omega_o$ which is split by beam splitter 2 into beams A and B. Beam A pumps a nonlinear medium 7, and may pass once through such medium or be reflected back through the medium by mirror 9. In some embodiments, beam A may pass through a frequency doubler 5, so that the nonlinear medium is pumped at frequency $2\omega_p$. The phase of the pump beam and, consequently, the phase of reduced noise (the "squeezed" phase) can be varied by including a phase tuning device 6 in the path of beam A. Pumping by beam A causes the index of refraction of the nonlinear medium to vary at twice the pump frequency, resulting in the generation of highly correlated photon pairs at angular frequencies $\omega = \omega_p \pm n\omega_c$, where $\omega_c$ is a frequency characteristic of the cavity formed by mirrors 8 and 10. As shown by B. Yurke, in *Physical Review*, Vol. A29, pp. 408–410 (1984), the reflectivity of mirror 10 must be less than the reflectivity of mirror 8 in order to obtain large noise reduction at the squeezed phase. Such noise reduction is produced periodically during each cycle of fields resonant in such cavity by the coherent polarization induced in the nonlinear medium by the pumping beam. In certain embodiments, beam B may be reflected by mirror 4, pass through a phase or amplitude modulator 3 and be directed by circulator 11 to the partially transmitting mirror 10, thereby combining with the output field C of the cavity to form a large amplitude field with squeezed noise in one phase. This large amplitude squeezed field is directed to the output port 12 by circulator 11.

Figure 2:
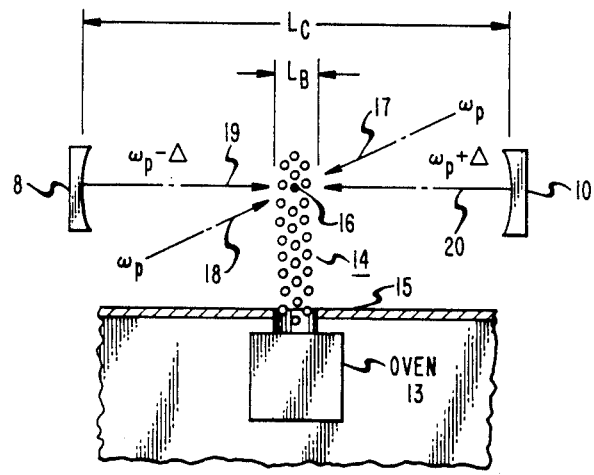
FIG. 2 is a side view of a parametric amplifier incorporating four-wave mixing in a nonlinear medium, constructed in accordance with the principles of this invention.

One example of a parametric amplifier according to this invention is shown in FIG. 2, in which a beam of sodium atoms 14 of width $L_B (L_B \approx 1$ cm) is produced by oven 13 and collimator 15 and pumped in (mixing) region 16 by pump beams 17 and 18 of frequency $\omega_p$. The light in beams 19 and 20, having frequency components at the cavity resonant frequencies $\omega_p \mp \Delta$, respectively, where $\Delta = n\omega_c$, becomes squeezed as it propagates through the pumped sodium beam. To obtain maximum squeezing, the pump frequency $\omega_p/2\pi$ is chosen near the $\lambda = 589.0$ nm D$_2$ atomic resonance of sodium (approximately 1.5 GHz to the high frequency side of the weaker hyperfine component), and $\omega_c/2\pi$ is taken to be 140.5 MHz, corresponding to a separation $L_c \approx 107$ cm of mirrors 8 and 10. In a recent experiment, reported by R. E. Slusher et al., in *Physical Review Letters*, Vol. 55, No. 2, pp. 2409–2412 (1985) (included herein by reference), a working device according to FIG. 1 and FIG. 2 was demonstrated to produce noise reduction at frequencies $\omega_p \pm 3\omega_c$ approximately 7% below the uniform background level of quantum noise (corresponding to squeezing of about 20% in the actual vacuum fluctuation noise when other noise sources and system efficiency are taken into account). Squeezing of light having large amplitude noise was also demonstrated in this experiment, illustrating that noise reduction according to this invention is not limited to quantum noise and hence can produce significant improvement in devices in which, at the level of the present art, noise far exceeds the quantum limit.

Figure 3:
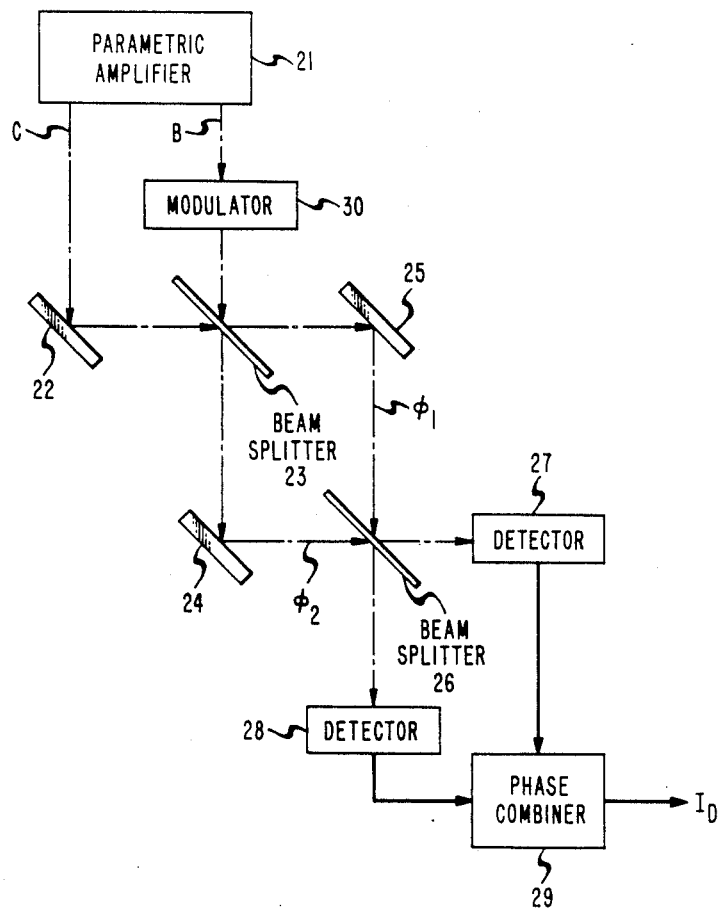
FIG. 3 is a top view of an interferometer constructed in accordance with the principles of this invention.

An interferometer according to the present invention is shown in FIG. 3, in which a noise-reducing device incorporating a parametric amplifier 21 according to FIG. 1 produces a reference beam B and a squeezed beam C. For best performance beam C should be squeezed both in frequency components $\omega_p \pm \omega_s$ and $\omega_p \pm 3\omega_s$, where $\omega_s$ is an offset frequency. The frequencies $\omega_p \pm \omega_s$ and $\omega_p \pm 3\omega_s$ can all lie within the bandwidth of a single cavity mode of the parametric amplifier or could be distinct cavity modes. Beam B is passed through an AM or FM modulator 30, which produces sideband frequencies displaced from the pump frequency, $\omega_p$, by $\pm \omega_s$. In certain embodiments it may be desirable that modulator 30 suppress the central frequency $\omega_p$, but this is not essential. After passing through beam splitters 23 and 26, and being reflected by mirrors 22, 24 and 25, beams B and C arrive at photodetectors 27 and 28. The difference in the photocurrents produced by photodetectors 27 and 28 is then measured, using a 180° phase-combiner 29.

The effect of the device shown in FIG. 3 is to combine the output of the modulator 30 and the squeezed output of parametric amplifier 21 in the interferometer formed by 23, 24, 25 and 26. A phase difference $\Phi = \Phi_1 - \Phi_2$ in the two arms of the interferometer can be detected at a frequency $2\omega_s$ in the output detector current $I_D$, which is given by $$I_D = I \cos \Phi \cos (2\omega_s t + \theta),$$

where I is proportional to the intensity of the modulator output and $\theta$ is a phase adjusted for the pump beam relative to the squeezing cavity. The variance (error) in the measured phase difference $\Phi$ is reduced when squeezed beam C is injected into the interferometer. In principle, one could achieve a variance $\Delta\Phi$ given by $$\Delta\Phi = (G^{\frac{1}{2}} - (G-1)^{\frac{1}{2}})/I^{\frac{1}{2}},$$

where $G \geq 1$ is the gain for squeezed noise reduction ($G = 1$ for no squeezed noise reduction). Thus, $\Delta\Phi$ is reduced for $G > 1$, and is proportional to $G^{-\frac{1}{2}}$ for large G, leading to the possibility of very large noise reduction. Alternatively, a given variance $\Delta\Phi$ can be obtained with less input signal intensity (smaller I), which can be important because of mirror heating instabilities or laser power limitations.

Figure 4:
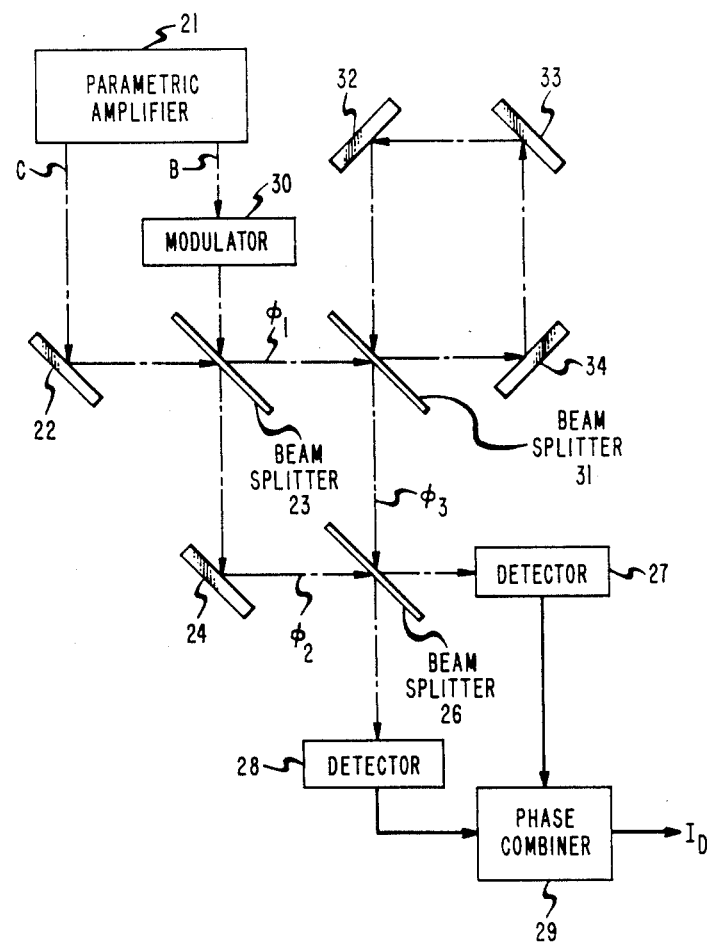
FIG. 4 is a top view of a ring gyroscope constructed in accordance with the principles of this invention.

A ring gyroscope according to the present invention is shown in FIG. 4, which has the form of FIG. 3, except that mirror 25 is replaced by the ring gyroscope formed by beam splitter 31 and mirrors 32, 33 and 34. In this embodiment a rotation rate of such ring is reflected in a phase difference $\Phi_3 - \Phi_2$ between the signal entering and leaving the ring at splitter 31 (see, for example, J. L. Davis and S. Ezekiel, in *Optics Letters*, Vol. 6, pp. 505–507 (1981)), and $I_D$ measures the difference $\Phi = \Phi_3 - \Phi_2$. The above formulas for $I_D$ and $\Delta\Phi$ are also valid in this case, and hence limitations on the accuracy of ring gyroscopes by noise in prior art can be surpassed for gains $G > 1$.

What is claimed is:

1. A coherent communications system comprising a low-noise device comprising first means for producing therein squeezed states of an electromagnetic field, such that the noise associated with at least two frequencies of said field is reduced relative to the minimum uniform level of the noise of said field, said first means comprising
   (a) a parametric amplifier comprising a cavity and, in said cavity, a non-linear medium;
   (b) input means for introducing an electromagnetic field of a first frequency into the parametric amplifier, and
   (c) output means for coupling a multi-frequency electromagnetic field from the parametric amplifier, the multi-frequency field coupled from the parametric amplifier comprising at least two quantum-correlated frequencies that are different from the first frequency, the field at said two field frequencies exhibiting said squeezed states;
   (d) said device further comprising means for comparing the phases of a reference signal and a squeezed state output signal from said parametric amplifier.

2. A low-noise device comprising first means for producing therein squeezed states of an electromagnetic field, such that the noise associated with at least two frequencies of said field is reduced relative to the minimum uniform level of the noise of said field, said first means comprising
   (a) a parametric amplifier comprising a cavity and, in said cavity, a non-linear medium;
   (b) input means for introducing an electromagnetic field of a first frequency into the parametric amplifier, and
   (c) output means for coupling a multi-frequency electromagnetic field from the parametric amplifier, the multi-frequency field coupled from the parametric amplifier comprising at least two quantum-correlated frequencies that are different from the first frequency, the field at said two field frequencies exhibiting said squeezed states.

3. The device of claim 2, wherein said first means comprise means for reducing said noise periodically during each cycle of said electromagnetic field.

4. The device of claim 2, wherein said first means comprise means for reducing said noise to less than 90% of its minimum uniform level.

5. The device of claim 2, said minimum uniform level being as required by quantum mechanics.

6. The device of claim 2, comprising means for pumping said non-linear medium at the first frequency which lies between said quantum-correlated frequencies.

7. The device of claim 2, further comprising means for comparing the phases of a reference signal and a squeezed state output signal from said parametric amplifier.

8. An interferometer comprising a low-noise device comprising first means for producing therein squeezed states of an electromagnetic field, such that the noise associated with at least two frequencies of said field is reduced relative to the minimum uniform level of the noise of said field, said first means comprising
   (a) a parametric amplifier comprising a cavity and, in said cavity, a non-linear medium;
   (b) input means for introducing an electromagnetic field of a first frequency into the parametric amplifier, and
   (c) output means for coupling a multi-frequency electromagnetic field from the parametric amplifier, the multi-frequency field coupled from the parametric amplifier comprising at least two quantum-correlated frequencies that are different from the first frequency, the field at said two field frequencies exhibiting said squeezed states;
   (d) said device further comprising means for comparing the phases of a reference signal and a squeezed state output signal from said parametric amplifier.

9. A ring gyroscope comprising an interferometer which comprises a low-noise device comprising first means for producing therein squeezed states of an electromagnetic field, such that the noise associated with at least two frequencies of said field is reduced relative to the minimum uniform level of the noise of said field, said first means comprising
   (a) a parametric amplifier comprising a cavity and, in said cavity, a non-linear medium;
   (b) input means for introducing an electromagnetic field of a first frequency into the parametric amplifier, and
   (c) output means for coupling a multi-frequency electromagnetic field from the parametric amplifier, the multi-frequency field coupled from the parametric amplifier comprising at least two quantum-correlated frequencies that are different from the first frequency, the field at said two field frequencies exhibiting said squeezed states;
   (d) said device further comprising means for comparing the phases of a reference signal and a squeezed state output signal from said parametric amplifier.

* * * * *